Nov. 29, 1960
G. CHAPPAZ ET AL
2,962,023
MEDICATOR
Filed Oct. 22, 1956
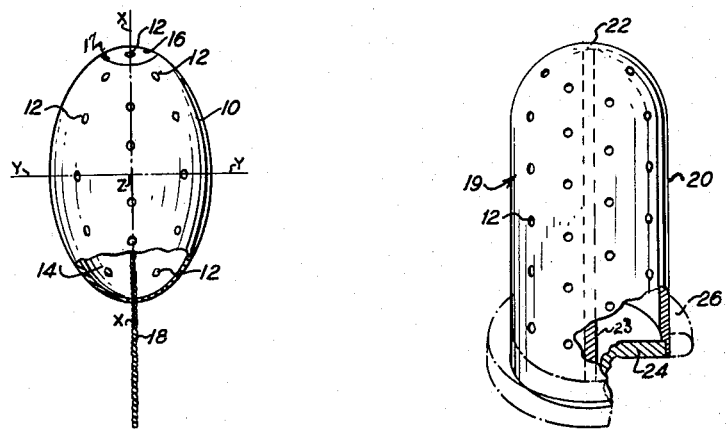
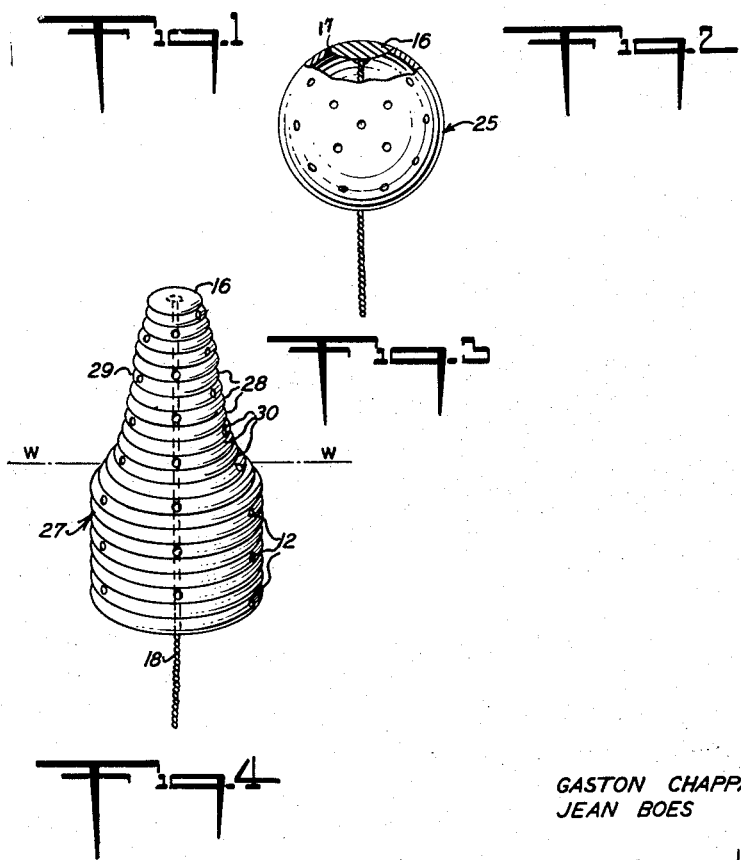
INVENTORS
GASTON CHAPPAZ
JEAN BOES
BY
ATTORNEY

United States Patent Office 2,962,023
Patented Nov. 29, 1960

2,962,023

MEDICATOR

Gaston Chappaz and Jean Boes, both of 14 Rue de Clichy, Paris 9, France

Filed Oct. 22, 1956, Ser. No. 617,360

6 Claims. (Cl. 128—260)

This invention relates to a medicating device comprising a container for liquid, gelatinous, or particulate solid medicating substance, adapted to be completely inserted into the vaginal cavity for supply of medicating substance to the cavity walls over long periods of time.

More particularly, our invention relates to a medicator comprising a permanent body shaped to fit and remain stably and securely supported within the vaginal cavity by the cavity walls in desired fixed position therein for medicating the cavity walls and may even be shaped to conform to that cavity for continuous dispensing of a medicating substance contained in the hollow interior of the medicator over extended periods of time. The medicator is adapted to be readily emplaced in an exact position within the vaginal cavity for application of medication to the entire cavity wall or, if desired, only to a specific part of the wall to be medicated and to be readily removed from such cavity at will. Thus, the medicator may have various shapes as desired for complete insertion within the vaginal cavity with optimum comfort.

The continuous supply of medication by the medicator of this invention enables medication of most difficultly medicated cavities coated with mucosa by the continuous supply of the medicament through perforations in the medicator walls in contact with the walls of the vaginal cavity at a slow but continuous rate, such rate being varied as desired by the size and number of perforations in the medicator. Such medicator finds great use in treatment of vaginal cavities both in the human as well as the veterinarian fields.

The medicator of this invention, primarily constructed for slow continuous medication from large supply of medication carried thereby, is in contrast to known medicators wherein the medicator dispenses all of its content of medicament to the cavity immediately, or where the same result obtains by collapse, melting or dissolution of a medicating body such as results from use of medicinal suppositories, capsules, medicating syringes, and the like.

The medicator hereof comprises a container having walls of solid material, usually plastic substance, of such substantial permanence and inertness, that it is not attacked by usual medicating agents, body fluids or chemical disinfecting agents, and is thermally stable to resist deformation, warping or discoloration under usual sterilizing conditions, particularly heating to sterilize, such as by boiling or steaming for extended periods, even in the presence of disinfecting chemicals. Such medicator may therefore be adequately sterilized before use by usual physical or chemical sterilizing methods and after extended periods of use may be again sterilized for reuse.

While the medicator may be formed of solid plastic substance of any desired shape and size for any particular body cavity, and the plastic substance may have some resiliency or flexibility whereby it may be slightly deformed in use by pressure of the cavity walls for optimum comfort to the individual being medicated, it is essential that the plastic body have sufficient rigidity to prevent both permanent deformation as well as complete elastic collapse within the body under pressure of the body cavity walls so that the bulk of the medicament contained in the medicator will not be quickly forced out of the medicator due to pressure of the vaginal walls and collapse of the medicator responsive to such pressure.

Thus, the medicator may be formed by molding or mechanical shaping, including machining from a thermosetting plastic, or even a thermosoftening plastic, providing the latter will not substantially soften at temperatures below about 220° F., whereby it will have a sufficient stability to resist permanent deformation by softening during sterilization. Thus, the product may be of synthetic or natural rubber or resin of sufficient rigidity to avoid mechanical collapse under pressure in use. Useful plastic materials for this purpose are vulcanized natural or synthetic rubber sufficiently hard to resist complete collapse, super polyamides (nylon), cellulose esters and ethers, polystyrene, acrylic resins (Lucite), polyvinyl acetate-chloride, phenol formaldehyde and urea formaldehyde resins.

The specific construction and other inherent advantages of the medicators of this invention, will be apparent in the description shown in the drawings which now follows, in which:

Fig. 1 illustrates an ellipsoidal shaped medicator in which two of the dimensions may be the same as to comprise an egg shaped ellipsoid or all three of the dimensions may be different as to be ovular.

Fig. 2 illustrates a medicator which is generally cylindrical but having one end rounded.

Fig. 3 illustrates a medicator which is spheroidal in shape.

Fig. 4 illustrates a medicator having the upper end partially conically shaped and rounded to be frusto-conical, the lower end being substantially cylindrical.

Thus, as shown in these several illustrated shapes of medicators, Figs. 1–4, the medicator may be ellipsoidal, cylindrical, spheroidal, conical or any other useful shape, particularly including a normal shape of a body cavity to be medicated.

Referring to Fig. 1, the medicator comprises a plastic wall 10, of sufficient thickness to impart the necessary strength to the medicator to prevent collapse under pressure of the vaginal walls. It is shaped to an ellipsoid whereby it may be symmetrical with respect to the long or X axis, both the Y and Z axes being substantially of the same dimension whereby the medicator is substantially egg shaped, and a section normal to the long X axis would be circular. However, the Y and Z axes do not need to be of the same dimension whereby a section normal to the long or X axis is an ellipse and the solid geometrical shape in three dimensions is ovular. Moreover, true symmetry of dimensions, the upper half with respect to the lower, is not essential whereby the product is egg shaped rather than true ellipsoid.

The wall 10 has numerous perforations 12, whereby medicament enclosed within the hollow interior 14, as a reservoir or depot supply of medicament, passes outward through the perforations 12, for medicating the surrounding body wall of the vaginal cavity in which it is inserted.

A removable closure 16, shown in section Fig. 3, is fitted and frictionally secured into the upper end to form a smooth continuation of outer wall 10. The wall 10, and preferably the closure itself 16 forming part of that wall, has attached a thread or string 18 of cotton, silk, nylon linen or other threadlike material of substantial strength and of sufficient length to serve as an aid in removal of the medicator from the vaginal cavity, when grasped and pulled. Of course, other methods of attaching the cord or string may be used. While the perforations as shown are symmetrically disposed about the medicator walls, they may also be irregularly placed for dispensing medication only over a restricted portion of the cavity wall or in a single portion of the medicator walls to pass medication in a particular direction. The number and size of the perforation may be varied to accommodate the type of medicament and quantity or rate at which the medicament is to be dispensed.

Fig. 2 shows a cylindrical medicator 19 having a vertical cylindrical wall 20, and is rounded at the top to a spherical wall 22, all of the wall 20 and 22 similarly bearing perforations 12, for slow release of medicament therefrom. A closure 24, is fitted into the bottom wall. Where medication downward is not needed, no perforations need be placed in the closure such as the bottom closure 24. The string 18 as shown in Fig. 1, is removed in Fig. 2, but such may be similarly used with the cylindrical medicator of Fig. 2. However, it is sometimes preferred to make a cylindrical medicator of this type sufficiently elongated, by use of long cylindrical walls 20 to contact an elongated cylindrical surface area of the cavity wall for medication, but to mount an outer flange shown as a dotted portion 26 around the lower cylindrical end, so that the medicator can be emplaced or removed by gripping only that flange 26. The flange portion 26 therefore, extends laterally only sufficient to allow grasping with the fingers or by an instrument for firm grip for removal of the medicator from the cavity in this manner. It is sometimes desirable to divide the medicator into separate compartments each filled with a different medicating substance, and for this purpose a partition 25 may be mounted in the medicator, separating it into chambers.

Fig. 3 illustrates a spherical medicator 25 having perforated walls and a closure.

A preferred form of medicator of this invention and, as pointed out below in Example II, particularly useful for vaginal medication, has at least a portion of the outer surface of the medicator corrugated or provided with round curved portions extending outward from the surface as rounded lands separated by grooves. These allow ready grasping of the medicator by hand and accurate emplacement of the medicator in the vaginal cavity as well as removal therefrom. That corrugated or grooved surface cooperates with natural body folds within the vaginal cavity for optimum medication of irregular and folded vaginal cavity walls and secure retainment in desired position in the cavity. That type of medicator is illustrated in Fig. 4 which shows a body 27, wherein at least the upper end 29 of the medicator 27 is frusto-conical and the lower end, below the line w—w, may be cylindrical, and further illustrates the forming of the outer surface of the medicator with annular undulations, convolutions or corrugations 28, which comprise half-rounded rings assembled into a continuous wall, one above the next as a tier, secured tangentially into an integral wall of a hollow medicator body. The perforations 12, for more intimate contact with the wall of a cavity may be disposed in the outermost portion of each corrugation. Obviously there may be instances where the perforations 12 in such structure are more desirably placed within the grooves 30 between the undulations or corrugations.

While the medicator as shown in the several views of the drawing, may be of any desired shape for optimum comfort, all, as shown in each of the figures, are continuously rounded over at least the inner insertion end.

The following examples illustrate the practice of this invention:

*Example I*

As an example of use, a medicator is formed of a thin walled ellipsoidal shape, as in Fig. 1, of polystyrene resistant to softening at temperatures below 220° F. with a wall thickness of ⅛ inch and fitted with a closure in one end. The closure 16 has a small groove 17 at the meeting edge of the cover and medicator wall so that the closure may be removed by inserting a knife tip or other sharp prying instrument. The medicator has numerous perforations spaced about ¼ of an inch apart, the perforations themselves being small holes of about 1/32 inch in diameter. The medicator is filled with a medicating cream which melts at body temperature and exudes slowly, but continuously through the perforations 12. That device, after emplacing the closure 16 is inserted in the body cavity. A small nylon string 18, depends from medicator and extends outside of the body cavity. After 24 to 72 hours, depending upon the need and type of medicament, the medicator is removed from the body cavity by pulling the string. The cover 16 is removed, the medicator is cleaned, again disinfected by sterilization, refilled and may be used again in the same manner. Various medicaments such as creams, jellies, liquids and even powder, may be enclosed within the hollow cavity of the medicator. As indicated, variation in the type of excipient used as a carrier for the medicament and variation in the size of perforations and the number and placement of perforations, allows complete variation in rate of medication of the cavity in which the medicator is used.

*Example II*

The medicator of Fig. 4, of sterile Bakelite is filled with a vaginal jelly comprising a gellatine base modified to jelly consistency with glycerine and water. That composition comprises in 10 grs. of jelly base, 250 mg. of dodecaethyleneglycol monolaurate and 10 mg. of ricinoleic acid. The medicator is filled with the jelly and used for vaginal medication.

We claim:

1. A vaginal medicator comprising a single hollow compact rigid heat and chemical resistant plastic medicament container body dimensioned for insertion and complete retention entirely within the vaginal cavity, said body having annular side walls continuing as a curved surface into a tapered and rounded insertable end portion, said body comprising thin rigid walls and having numerous perforations distributed throughout said walls adapted to transfer medicament from the interior of said medicator to the exterior vaginal walls in contact therewith, said container body walls having an enlarged opening in one of its ends through which said medicator is filled and cleaned, a closure upon said opening frictionally secured to the walls of said medicator, said closure comprising a similar thin rigid plastic wall element having its outer surface faired to form a compact smooth continuation of the curved walls of said medicator, and at least one removing cord fastened to extend downward from the depending end of said medicator body of a length sufficient to depend outside of said cavity for grasping and removing said medicator positioned within the vaginal cavity.

2. A vaginal medicator comprising a single hollow compact rigid heat and chemical resistant plastic medicament container body of generally ellipsoidal shape whereby a section taken through said body perpendicular to its major axis ranges from a circle to an ellipse, dimensioned for insertion and complete retention entirely within the vaginal cavity, said body having its annular side rigid walls faired into a tapered and rounded insertable end portion, said body comprising thin walls resistant to collapse under pressure of the vaginal cavity walls and having numerous perforations distributed throughout said walls adapted to transfer medicament from the interior of said medicator to the exterior vaginal walls in contact therewith, said body walls having an enlarged opening in one of its ends through which said medicator is filled and cleaned, a closure upon said opening frictionally secured to the walls of said medicator, said closure having its outer surface faired to form a smooth continuation of the curved walls of said medicator, and at least one removing cord fastened to extend downward from the depending end of said medicator body of a length sufficient to depend outside of said cavity for grasping and removing said medicator positioned within the vaginal cavity.

3. A vaginal medicator comprising a single hollow compact rigid heat and chemical resistant plastic medicament container body of generally elongated cylindrical shape, dimensioned for insertion and complete retention entirely within the vaginal cavity, said body having its annular side walls continuing into a rounded insertable end portion and having its opposite end substantially planar perpendicular to the axis of the cylindrical portion, said body comprising thin rigid walls resistant to collapse under pressure of the vaginal cavity walls and having numerous perforations distributed throughout said walls adapted to transfer medicament from the interior of said medicator to the exterior vaginal walls in contact therewith, said opposite planar end comprising an opening in said body and having a closure frictionally fitted to said opening and secured to the cylindrical walls thereabout, said closure having its outer surface faired to form a smooth continuation of the walls of said medicator, and at least one removing cord fastened to extend downward from the depending end of said medicator body of a length sufficient to depend outside of said cavity for grasping and removing said medicator positioned within the vaginal cavity.

4. A vaginal medicator comprising a single hollow compact rigid heat and chemical resistant plastic substantially spherical medicament container body dimensioned for insertion and complete retention entirely within the vaginal cavity, said body comprising thin rigid walls resistant to collapse under pressure of the vaginal cavity walls and having numerous perforations distributed throughout said walls adapted for transferring medication from the interior of said medicator to the exterior vaginal walls in contact therewith, said body walls having an enlarged opening through which said medicator is filled and cleaned, a closure upon said opening frictionally secured to the walls of said medicator, said closure having its outer surface faired to form a smooth continuation of the curved walls of said medicator, and at least one removing cord fastened to extend downward from the depending end of said medicator body of a length sufficient to depend outside of said cavity for grasping and removing said medicator positioned within the vaginal cavity.

5. A vaginal medicator comprising a single hollow compact rigid heat and chemical resistant plastic medicament container body dimensioned for insertion entirely within the vaginal cavity, said body having annular side walls continuing as a curved surface into a tapered and rounded insertable end portion, said body comprising thin rigid plastic walls having numerous perforations distributed at least about the tapered end portion adapted to transfer medicament from the interior of said medicator to the exterior vaginal walls in contact therewith, said container body walls having an enlarged opening in one of its ends through which said medicator is filled and cleaned, a closure upon said opening frictionally secured to the walls of said medicator, said closure comprising a similar thin rigid plastic wall element having its outer surface faired to form a compact smooth continuation of the curved walls of said medicator, said body walls having a series of regular undulations comprising rounded lands extending laterally of said annular walls, said lands alternating with the comparatively depressed wall surface separating said lands.

6. A vaginal medicator comprising a single hollow body dimensioned for insertion entirely within the vaginal cavity, said body comprising a generally conically shaped insertion end portion continuing into a cylindrical body portion, a series of undulations comprising laterally extending rounding lands alternating with grooves disposed upon at least a portion of the annular surface of said body, said body comprising thin walls resistant to collapse under pressure of the vaginal cavity walls and having numerous perforations distributed throughout said walls adapted to transfer medicament from the interior of said medicator to the exterior vaginal walls in contact therewith, said body walls having an enlarged opening in one of its ends through which said medicator is filled and cleaned, a closure upon said opening frictionally secured to the walls of said medicator, said closure having its outer surface faired to form a smooth continuation of the curved walls of said medicator, and at least one removing cord fastened to said medicator body of a length sufficient to depend outside of said cavity for grasping and removing said medicator positioned within the vaginal cavity.

References Cited in the file of this patent

UNITED STATES PATENTS

| | | |
|---|---|---|
| 298,720 | Anderson | May 20, 1884 |
| 1,640,928 | Donovan | Aug. 30, 1927 |
| 2,017,334 | Ackerman | Oct. 15, 1935 |
| 2,392,045 | Hudgins | Jan. 1, 1946 |

FOREIGN PATENTS

| | | |
|---|---|---|
| 460,204 | Italy | Dec. 13, 1950 |